United States Patent [19]

Zanzig

[11] Patent Number: 4,633,038
[45] Date of Patent: Dec. 30, 1986

[54] SUPPLY CIRCUIT FOR A VARIABLE LOAD, PARTICULARLY FOR A LINE CIRCUIT IN TELEPHONE SYSTEMS

[75] Inventor: Jürgen Zanzig, Weil der Stadt, Fed. Rep. of Germany

[73] Assignee: International Standard Electric Corporation, New York, N.Y.

[21] Appl. No.: 538,649

[22] Filed: Oct. 3, 1983

[30] Foreign Application Priority Data

Oct. 12, 1982 [DE] Fed. Rep. of Germany ....... 3237681

[51] Int. Cl.$^4$ ...................... H04M 1/76; H04M 19/00
[52] U.S. Cl. ..................................... 379/400; 379/412
[58] Field of Search ................. 179/16 F, 18 FA, 70, 179/77, 16 AA, 170 NC

[56] References Cited

U.S. PATENT DOCUMENTS

| | | | |
|---|---|---|---|
| 3,943,432 | 3/1976 | Colardelle et al. | 323/7 |
| 4,167,654 | 9/1979 | Bolus et al. | 179/81 R |
| 4,203,009 | 5/1980 | Tattersall | 179/16 AA |
| 4,267,408 | 5/1981 | Schoofs | 179/77 |
| 4,287,392 | 9/1981 | Melindo | 179/16 AA |
| 4,321,430 | 3/1982 | Ferrieu | 179/18 FA |
| 4,356,354 | 10/1982 | Ferrieu | 179/16 AA |
| 4,370,527 | 1/1983 | Ruff et al. | 179/70 |
| 4,400,588 | 8/1983 | Stobbs et al. | 179/81 R |

FOREIGN PATENT DOCUMENTS 2938346 4/1980 Fed. Rep. of Germany ........ 179/77

Primary Examiner—Gene Z. Rubinson
Assistant Examiner—R. Vaas
Attorney, Agent, or Firm—John T. O'Halloran; Jeffrey P. Morris

[57] ABSTRACT

The invention relates to a supply circuit for a variable load, particularly for a line circuit in telephone systems.

Conventional supply circuits, in which each of the two supply-current branches to the line wires contains the collector-emitter path of a transistor in series with an emitter resistor, offer a high AC resistance to voice-frequency voltages and longitudinal noise voltages, so that the bridging loss of the line remains small. To achieve a low AC resistance of the supply circuit to the longitudinal noise voltages, special measures in the control circuits of the transistors, particularly the use of a nonlinear element in the form of a CRD current-limiting diode in parallel with the controlled current path of each of the transistors, are proposed. These measures greatly reduce the amplitude of the longitudinal noise voltages at the inputs of subsequent circuits, which are thus protected.

6 Claims, 2 Drawing Figures

SUPPLY CIRCUIT FOR A VARIABLE LOAD, PARTICULARLY FOR A LINE CIRCUIT IN TELEPHONE SYSTEMS

BACKGROUND OF THE INVENTION

The present invention relates to a supply circuit.

Supply circuits of this kind serve mainly to supply power to a line circuit, including the subscriber line with the subscriber station. The balanced-to-ground feeding of the supply current through two equal-value resistors is important in order to obtain high crosstalk attenuation between different telephone channels. The feed resistances must be as high as possible for the voice-frequency range, so that the supply circuit will cause only a low bridging loss in the telephone circuit. Therefore, most of the conventional supply circuits, such as the one shown in FIG. 1 of DE-OS No. 25 21 894, contain chokes.

A supply circuit of the kind referred to at the beginning is disclosed in DE-OS No. 30 37 972. It requires no feed chokes. It offers a sufficiently high resistance to push-pull AC signals, so that the bridging loss of the line remains small. However, longitudinal voltages, so-called common-mode AC voltages, may be present on the line running to the variable load. These longitudinal voltages may be audio-frequency voltages, e.g., 16.66-Hz or 50-Hz voltages, or radio-frequency voltages that may damage subsequent circuits, such as the switching network connected to the line. While maintaining the supply current constant independent of such longitudinal voltages, the supply circuit disclosed in DE-OS No. 30 37 972 offers a high resistance to these longitudinal voltages, so that subsequent circuits may be damaged. In addition, the longitudinal voltages may narrow the control range of the supply circuit regulating the supply current. This narrowing of the control range is due to the fact that the supply-circuit transistors, which have a high dynamic resistance, must also suppress the longitudinal voltage. When overdriven by longitudinal voltages, these transistors may, therefore, lose their high resistance to push-pull AC signals (useful signals).

SUMMARY OF THE INVENTION

Accordingly, the object of the invention is to provide a supply circuit of the above kind which presents a low resistance to longitudinal voltages and whose control range is not adversely affected.

The invention has the following advantages. The induced longitudinal audio-frequency voltages do not drop across the supply circuit of high dynamic resistance but are diverted to ground by balanced low-impedance paths. The induced longitudinal radio-frequency voltages do not drop across the supply circuit, either, but are also diverted to ground by balanced low-impedance paths. There are no demodulation products, which are possible in view of the feed-transistor characteristics. The longitudinal voltage superimposed on the supply current cannot drive the feed transistors into saturation, so that only the emitter resistors are effective. The longitudinal voltage therefore drops across the internal resistance of the noise source and across the line itself, and does not act on subsequent circuits in the useful-signal path. This is especially important in the case of long subscriber lines. Furthermore, the supply circuit consumes very little power when the loop is open. Only simple, low-cost components are required, so that the circuit can be readily implemented with integrated-circuit technology.

The first resistor is preferably designed as a current-limiting diode or in MOS transistor whose gate and source terminals are interconnected.

It may be required that the supply circuit must not be destroyed if a ground fault occurs on one or both line wires or if the voltage of the supply-voltage source reaches one or both line wires direct. In both cases, excessive collector currents may flow in the supply-circuit transistors, and considerable power may be dissipated in the transistors and emitter resistors. These collector currents and powers are limited.

It is advantageous to also limit the power dissipation of the supply-circuit transistors.

As the supply circuit now offers a low resistance to the longitudinal voltages present on the subscriber line, longitudinal noise voltages superimposed on the voltage from the supply-voltage source may reach the subscriber line from the supply-voltage source. This is prevented in accordance with the present invention.

An embodiment of the invention will now be explained in more detail with reference to the accompanying drawing, in which:

DESCRIPTION OF THE PREFERRED EMBODIMENTS

Figure 1:
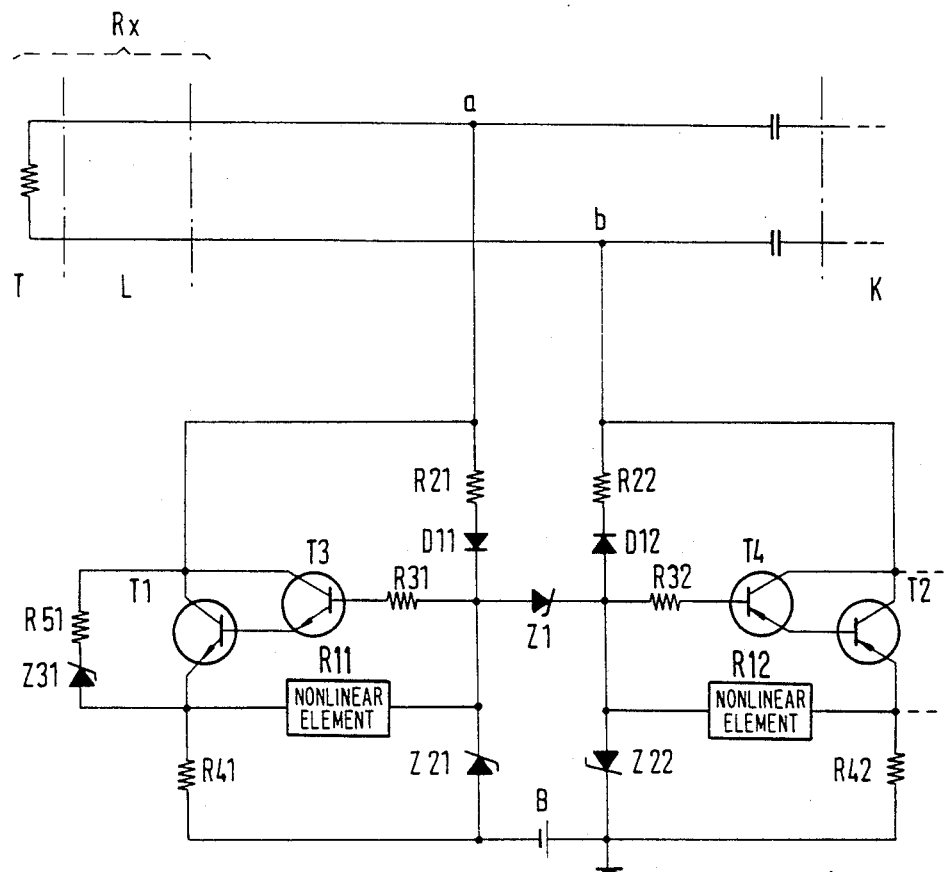
FIG. 1 shows a supply circuit in accordance with the invention for a line circuit of a telephone system.

The supply circuit shown in FIG. 1 serves to supply power to a subscriber station T over a subscriber line L. The subscriber line L and the subscriber station T represent a variable load Rx, which may vary within predetermined limits depending on the resistances of subscriber lines L of different length.

Current for the load is supplied from a battery B; it may also be provided by a power supply. Each of the feed resistances connected to the wires a and b of the subscriber line L, which is connected to a switching network K of the telephone system via coupling capacitors or other means blocking the flow of direct current, is formed by the collector-emitter path of a transistor in series with an emitter resistor, the two emitter resistors being of equal value. In one of the two supply-current branches, this series combination consists of a transistor T1 and an emitter resistor R41, while in the other loop-current branch, it consists of a transistor T2 and an emitter resistor R42. The collector of the transistor T1 is connected to the wire a, and the emitter resistor R41 is connected to the negative terminal of the battery B. The collector of the transistor T2 is connected to the wire b, while the emitter resistor R42 is coupled to the grounded, positive terminal of the battery B. The transistor T1 is an npn transistor, and the transistor T2 a pnp transistor.

Connected between the wire a and the negative terminal of the battery B is a series combination of a resistor R21, a diode 11, and a zener diode Z21. Elements R22, D12, and Z22 are arranged in the other supply-current branch in a similar manner. A zener diode Z1 is inserted between the junction of the diode D11 and the zener diode Z21 and the junction of the diode D12 and the zener diode Z22. Connected between the first-mentioned junction and the base of the transistor T1 is a resistor R31 in series with the base-emitter path of an npn transistor T3, whose collector is coupled to that of the transistor T1. Inserted between the second-mentioned junction and the base of the transistor T2 is a resistor R32 in series with the base-emitter path of a transistor T4, whose collector is coupled to that of the transistor T2. A nonlinear element R11 is inserted between the first-mentioned junction and the emitter of the transistor T1, and a nonlinear element R12 is connected between the second-mentioned junction and the emitter of the transistor T2. The two elements R11 and R12 have a linearly rising current-voltage characteristic in the low-voltage range and a subsequent constant current-voltage characteristic in the higher-voltage range. They are preferably current-limiting diodes or MOS transistors having their gate and source terminals interconnected.

The two resistors R21 and R22 are of equal value; in a practical embodiment, each of them has a value of 22 kilohms. The two resistors R31 and R32 are equal-value resistors, too; each of them has a value of 47 kilohms. The value of each of the two emitter resistors is 300 ohms. The breakdown voltage of the zener diode Z1 is 27 V, while the breakdown voltage of each of the zener diodes Z21 and Z22 is 12 V. The battery has a voltage of 48 V. With these values, a voltage of 0.6 V dropped across the base-emitter path of each of the transistors, and a voltage of 0.5 V dropped across each of the resistors R31 and R32, while the current through each of the nonlinear elements R11 and R12 has a value of 1 mA, and the current through each of the emitter resistors R41 and R42 was 28 mA.

The symmetrical constant-current feeding takes place through the transistor pairs T1/3 and T2/4. The values of the resistors R31 and R32 are chosen so that the base currents flowing in cause a negligible voltage drop compared with the breakdown voltage of the zener diode Z1 and, on the other hand, a low open-circuit current through the base-emitter paths of the transistors. The insensitivity of the supply circuit to longitudinal voltages results from the fact that the longitudinal currents flowing into the two line wires cause voltage drops across the emitter resistors which are equal in magnitude and phase but cancel each other in the common input circuit of the transistor pairs. Hence, the transistors are not driven into saturation by the longitudinal voltages. Both transistors pairs "float" on the longitudinal voltage. The emitter-base voltages and the collector voltages vary at the rate of change of the longitudinal voltage. However, a longitudinal voltage does not drop across the transistors T1 and T2, so that the longitudinal voltage effective at the line wires a, b appears only across the low-value emitter resistors R41 and R42. Thus, the supply circuit offers a sufficiently low resistance to longitudinal voltages in comparison with the internal resistance of the longitudinal-voltage source and the line resistance. Consequently, subsequent circuits K are protected. This property of the supply circuit is cancelled if a fixed potential is connected to the base of transistor T3 or T4. This is the case, for example, in the above-mentioned DE-OS No. 30 97 972, where the zener diode is supplied with sufficient current. To guarantee a sufficient supply of current to the zener diode Z1 without sacrificing the insensitivity of the supply circuit to longitudinal voltages, in the present invention, nonlinear elements R11, R12 are connected in parallel with the series combinations of the base series resistors and the base-emitter paths of the transistor pairs. These elements limit the current through the zener diode Z1 to 1 mA. The voltage drop across these elements is determined by the two transistor pairs, and the high resistance to push-pull signals (useful signals) and the low resistance to common-mode signals (longitudinal noise signals) are not changed by the use of such elements.

To minimize the effect of different current gains of the transistors on the operating-point setting, the transistor pairs use feedback through the resistors R21 and R22. With short subscriber lines, different driving powers would cause an unfavorable power distribution at the transistors; with long subscriber lines, they might limit the maximum possible line length in an undesirable manner by overdriving one of the transistor pairs.

Conditions in the open-circuit state are as follows. Without the series-dropping resistors R31 and R32, under open-circuit conditions, a current equal to the loop current would flow through the base-emitter paths of the transistor pairs, the zener diode Z1 and the emitter resistors R41, R42, thus causing an unacceptable power consumption. These series-dropping resistors limit the current through the base-emitter paths to 0.2 mA, so that, together with the constant current of 1 mA flowing through the nonlinear elements R11, R12, a total open-circuit current of only about 1.2 mA flows. The constant current of 1 mA suffices to operate the zener diode Z1 in the breakdown region. To prevent a reverse current from flowing through the feedback resistor R22, the diodes D11 and D12 are provided for reducing the power consumption. Under open-circuit conditions, the small voltage drops across the emitter resistors R41 and R42 reduce the voltage drops across the elements R11 and R12 to half the value of the difference between the battery voltage and the breakdown voltage of the zener diode Z1.

During normal operation, a voltage of 10.5 V drops across each of the zener diodes Z21 and Z22, so that these diodes are cut off. In this case, they do not affect the special property of the supply circuit, i.e., that it "floats" on the longitudinal voltage with the reference voltage dropping across the zener diode Z1. Longitudinal currents must, therefore, cause 1.5-V voltage drops across the emitter resistors to turn on the zener diodes Z21 and Z22 and, thus, render the supply circuit insensitive to longitudinal currents. With the values given above and a line length of 1 km, this could only take place at longitudinal voltages of more than approx. 200 V. Zener diodes with higher breakdown voltages permit even higher longitudinal voltages but lead to a higher power consumption.

The zener diodes Z21 and Z22 serve to protect the components of the supply circuit; they are to limit the power consumption of the supply circuit in the following cases: There may be a ground fault on one or both of the line wires a, b, or one or both of the line wires may be at the potential of the ungrounded terminal of the battery B. The zener diode Z21 protects the supply circuit in the first case, while the zener diode Z22 offers protection in the second case. At the above-specified values of the supply-circuit components, a maximum emitter current of 35 mA flows through the transistors T1 and T2 under fault conditions.

Because of the simultaneously produced high voltage drop, these transistors must be power transistors, which, in addition, require heat sinks that take up much space. Also, such heat sinks cannot be used on board-equipping machines. The power dissipated in these transistors can be limited by connecting across the collector-emitter path of the transistor T1 a resistor R51 in series with a zener diode Z31, which is cut off during normal operation. In the practical embodiment mentioned above, this zener diode had a breakdown voltage of 18 V, while the resistor R51 had a value of 720 ohms. Normally, a voltage of less than 15 V drops across the collector-emitter path of the transistor T1.

Under fault conditions, in this case contact of the line wire a with ground, the breakdown voltage of the zener diode Z31 will be exceeded. In that case, a large part of the power will be dissipated in this zener diode and the resistor R51, so that a small, inexpensive type can be chosen for the transistor T1. All three components can be used on board-equipping machines.

The transistor T2 is provided with an analogous series combination, as indicated. For it and the series combination, conditions are similar.

Figure 2:
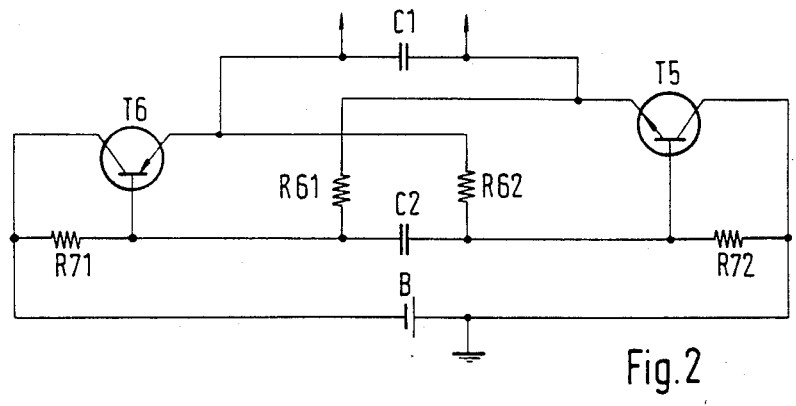
FIG. 2 shows a circuit arrangement for suppressing the noise voltages coming from the supply-voltage source.

The supply circuit shown in FIG. 1 offers a low resistance to longitudinal noise voltages present on the subscriber line L. If longitudinal noise voltages are to be expected at the battery terminals, however, this property of the supply circuit also allows such longitudinal voltages from the battery B to reach the subscriber line L. In FIG. 2, therefore, a circuit arrangement is proposed which offers a low resistance to longitudinal noise voltages coming from the subscriber line while presenting a high resistance to longitudinal noise voltages coming from the battery B. This circuit can be used in place of the grounded battery B of FIG. 1. An npn transistor T5 and a pnp transistor T6 have their collector-emitter paths inserted in the leads to the battery B, which is connected to the collectors. Located between the emitter of the transistor T6 and the grounded terminal of the battery B is a voltage divider R62, R72, which has its tap connected to the base of the transistor T5. A voltage divider R61, R71 having its tap coupled to the base of the transistor T6 is connected between the emitter of the transistor T5 and the negative terminal of the battery B. The emitters of the transistors T5, T6 are coupled through a capacitor C1 designed to block radio-frequency voltages. The bases of these transistors are coupled through a capacitor C2 designed to block audio-frequency voltages.

The transistors T5, T6 are operated with a bias of approximately 2 V. They offer a low resistance to the voltages coming from the subscriber line L. To noise voltages superimposed on the battery voltage, however, they present a high resistance, so that such noise voltages cannot reach the subscriber line L.

I claim:

1. A transistor feed circuit including transistors each having an emitter, a collector and a base, for a variable load and with differently acting output resistance, particularly for a subscriber line in telephone systems, comprising:
a first terminal of a supply-voltage source connected via a series combination of the collector-emitter path of a first transistor and a first emitter resistor to a first terminal of a load resistor and to a first wire of said subscriber line connected to a telephone subscriber; a second terminal of said supply-voltage source connected via a series combination of the emitter-collector path of a second transistor and a second emitter resistor to a second terminal of said load resistor and to a second wire of said subscriber line, wherein the bases of said two transistors are interconnected via a series combination of the base-emitter path of a third transistor, a fourth resistor, a first zener diode, a fifth resistor, and the base-emitter path of a fourth transistor, wherein the collectors of said first and third transistors are electrically interconnected, wherein the collectors of said second and fourth transistors are interconnected, and wherein a junction of said fourth resistor and said first zener diode is coupled to said first terminal of said supply-voltage source through a sixth resistor, and a junction of said fifth resistor and said first zener diode to a second terminal of said supply-voltage source through a seventh resistor, such that a series combination of an eighth resistor and a second diode is inserted between said first terminal of said load resistor a junction of the fourth resistor and the first zener diode that a series combination of a ninth resistor and a third diode is inserted between the second terminal of the load resistor and a junction of the fifth resistor and the first zener diode, and that the sixth resistor and the sixth resistor are designed as nonlinear elements having a linearly rising current-voltage characteristic in the low-voltage range and a constant current-voltage characteristic in the higher-voltage range.

2. A transistor feed circuit as claimed in claim 1, wherein said sixth resistor and said seventh resistor are each formed by a current-limiting diode.

3. A transistor feed circuit as claimed in claim 1, wherein said sixth resistor and said seventh resistor are each formed by a MOS transistor having its gate terminal and source terminal interconnected.

4. A transistor feed circuit as claimed in claim 3, further including a second zener diode inserted between the first terminal of the supply-voltage source and the junction of the fourth resistor and the first zener diode, and a third zener diode inserted between the second terminal of the supply voltage source and the junction of the fifth resistor and said first zener diode, such that the breakdown voltages of said second and third zener diodes are chosen so that said zener diodes are off during normal operation, and on in the event of a ground fault on either or both of the wires of said subscriber line or in the presence of supply-voltage-source potential on either or both of the wires of said subscriber line.

5. A transistor feed circuit as claimed in claim 4, wherein one of said terminals of send supply voltage source is at negative potential and the collector-emitter path of the first transistor is shunted by a series combination of a resistor and a zener diode, which is biased off during normal operation of the feed circuit and biased on when the first line wire is accidentally grounded or the second line wire comes into contact with said terminal at a negative potential.

6. A transistor feed circuit as claimed in claim 5, wherein a balance circuit presenting a low impedance to the subscriber line and a high impedance to the supply-voltage source is inserted between the supply-voltage source and said subscriber line.

* * * * *